United States Patent
Henry

(10) Patent No.: US 7,642,313 B2
(45) Date of Patent: Jan. 5, 2010

(54) FLUOROPOLYMER WITH INORGANIC FLUORIDE FILLER

(75) Inventor: James Joseph Henry, Chester, PA (US)

(73) Assignee: Arkema Inc., Philadelphia, PA (US)

( * ) Notice: Subject to any disclaimer, the term of this patent is extended or adjusted under 35 U.S.C. 154(b) by 401 days.

(21) Appl. No.: 11/158,235

(22) Filed: Jun. 21, 2005

(65) Prior Publication Data

US 2005/0286841 A1  Dec. 29, 2005

Related U.S. Application Data

(60) Provisional application No. 60/582,943, filed on Jun. 25, 2004.

(51) Int. Cl.
*C08L 27/12* (2006.01)
(52) U.S. Cl. .................. 524/544; 385/100; 428/421
(58) Field of Classification Search ................ 524/544; 428/421; 385/100
See application file for complete search history.

(56) References Cited

U.S. PATENT DOCUMENTS

| 3,929,934 | A | * | 12/1975 | Moore et al. ............... 524/520 |
| 4,804,702 | A | | 2/1989 | Bartoszek |
| 4,898,906 | A | | 2/1990 | Hannecart |
| 5,036,121 | A | * | 7/1991 | Coaker et al. ............... 524/100 |
| 5,710,205 | A | * | 1/1998 | Davies et al. ............... 524/502 |
| 5,898,133 | A | * | 4/1999 | Bleich et al. ............ 174/121 A |
| 5,919,852 | A | | 7/1999 | Peltz et al. |
| 6,228,932 | B1 | * | 5/2001 | Saito ........................... 524/502 |
| 6,863,852 | B1 | * | 3/2005 | Ballard et al. ............... 264/112 |

FOREIGN PATENT DOCUMENTS

WO   WO-00/08346   *  2/2000

OTHER PUBLICATIONS

U.S. Appl. No. 10/755,504, filed Jan. 12, 2004, Henry, J.

* cited by examiner

*Primary Examiner*—Peter D. Mulcahy
*Assistant Examiner*—Henry Hu
(74) *Attorney, Agent, or Firm*—Thomas F. Roland

(57) ABSTRACT

The invention relates to the use of inorganic fluoride compounds as fillers for use in fluoropolymers, such as polyvinylidene fluoride (PVDF) and its copolymers. The filled fluoropolymer is especially useful in articles where limited combustion and low smoke are required—such as in cables and conduits. The invention also relates to a filled PVDF as a means of lowering costs and improving performance properties in any application.

9 Claims, 1 Drawing Sheet

FLUOROPOLYMER WITH INORGANIC FLUORIDE FILLER

This application claims benefit, under U.S.C. §119(e) of U.S. Provisional Application No. 60/582,943 filed Jun. 25, 2004.

FIELD OF THE INVENTION

This invention relates to the use of inorganic fluoride compounds as fillers for use in fluoropolymers, such as polyvinylidene fluoride (PVDF) and its copolymers. The filled fluoropolymer is especially useful in articles where limited combustion and low smoke are required—such as in cables and conduits. The invention also relates to a filled PVDF as a means of lowering costs and improving performance properties in any application.

BACKGROUND OF THE INVENTION

Copper, fiber optic, and plenum cables and conduit exist in large numbers in most commercial buildings. These cables and conduit may meet the limited combustible requirements as defined in standard NFPA 90A (Standard for the Installation of Air Conditioning and Ventilation Systems), which Standard requires that such cables when tested by standard NFPA-259 have a potential heat value ("PHV") below 3500 BTU/pound and when tested by NFPA-255 have a smoke developed index ("SDI") below 50 and a flame developed index ("FDI") below 25. Such limited combustible cables ("LC Cables") are also referred to in industry as Duct Cables, CMD, 25/50/8, 25/50, CMP-50 Cables and/or by other references indicating compliance with the PHV, SDI and FDI requirements referenced in the NFPA 90A Standard for limited combustible materials.

The LC Cable constructions are generally referred to as either copper (electrical) or fiber (fiber optic) cable constructions. Typical cable constructions are taught, for example, in U.S. Pat. No. 4,804,702. The components of a cable may include a jacket, primary insulation, a shield tape, and may include various sub-components such as a strength member, film, buffer, separator, pull cord, sub-jacket, all well known in the industry, any one or more of which may be made of a fluoropolymer resin like PVDF.

When cables are replaced, generally the old cable is left in place, and new cable run beside the abandoned cable. As the quantity of cable, both used and abandoned increases, the potential fire and smoke danger presented by these cables also increases. More stringent standards are being proposed to address the fire and smoke danger created by the large systems of cable.

To date, all LC Cables have been developed with fluorinated ethylene propylene ("FEP") resins for both their primary insulation and jacket components. PVDF has a potential heat ranging between 5700 and 6500 btu/lb, and inherently does not meet the limited combustible requirements for potential heat. PVDF has historically been limited to applications where its poor dielectric properties do not interfere with the performance of a cable. It has been understood in the industry that PVDF compounds with high limited oxygen index ("LOI") values would be useful for plenum grade cables. Such high LOI compositions are taught, for example, by U.S. Pat. Nos. 4,898,906 and 5,919,852.

U.S. patent application Ser. No. 10/755,504, describes SDI and/or FDI values when one or more of the FEP cable components (such as the jacket or primary insulation) are replaced by PVDF-based components, provided that the cable contains no more than about 50 weight % PVDF, based on the weight of the cable. In a preferred embodiment, one or more of the LC cable components are comprised of PVDF and from about 0.02 to about 2.0 weight % (more typically from about 0.05 to about 1.0 weight %), based on the weight of the PVDF, of a flame, smoke suppressant or char former such as one or more of a tungstate, molybdate or silicate.

Some inorganic fillers reduce the onset temperature of degradation such as the silicates, tungstates, and molybdates. Other fillers acted as acid scavengers such as zinc oxide and calcium carbonate and increased the onset temperature of degradation. In all cases, the addition of these fillers had some negative impact on heat release rate and/or smoke generation. These fillers in general react with effluent gasses produced by combustion of PVDF (such as HF), effecting the burning characteristics of the compound. Therefore, fillers are generally not used in PVDF.

Surprisingly it was found that inorganic fluorides, such as calcium fluoride, can be used as a non-reactive filler in PVDF, associated copolymers and other fluoropolymers. The inorganic fluorides can therefore be added indiscriminately to obtain a number of useful properties. The addition of fillers in fluoropolymers have multiple applications beyond that of limited combustible and plenum products including but not limited to increasing flexural modulus, increasing hardness, reducing coefficient of friction, reducing coefficient of thermal expansion, improving chemical and permeation resistance, reducing smoke generation, improving char forming characteristics, reducing the dielectric constant, and also acting as a low/moderate cost polymer extender.

SUMMARY OF THE INVENTION

It is accordingly a first objective of the invention to produce a PVDF composition having low combustion, low potential heat and low smoke production.

It is a second objective of the invention to produce a PVDF composition having good processability and good application properties.

It is a third objective of the invention to produce a PVDF composition meeting the requirements for a limited combustion material and having the ability be modified to meet targeted potential heat values.

It is a forth objective of the invention to produce a PVDF composition having targeted potential heat values while maintaining low smoke and low flame propagation properties.

It is a fifth objective of the invention to produce a PVDF composition useful for fiber optic cables and raceway conduit products.

It is a sixth objective of the invention to identify a low cost extender that can be added to any fluoropolymer and not effect the burning characteristics of the fluoropolymer.

It is the seventh objective of the invention to develop a method of improving the low smoke and burning characteristics of fluoropolymers, especially PVDF and its copolymers, and FEP used in existing plenum type applications.

It is an eighth objective to provide a filled fluoropolymer having reduced shrinkage and tighter mechanical tolerance.

These objectives of the invention are accomplished, in accordance with the principles of a preferred embodiment of the invention, by a composition comprising:

a) from 20 to 99 percent by weight of one or more fluoropolymers; and b) from 1 to 80 percent by weight of one or more inorganic fluorides.

DETAILED DESCRIPTION OF THE INVENTION

Figure 1:
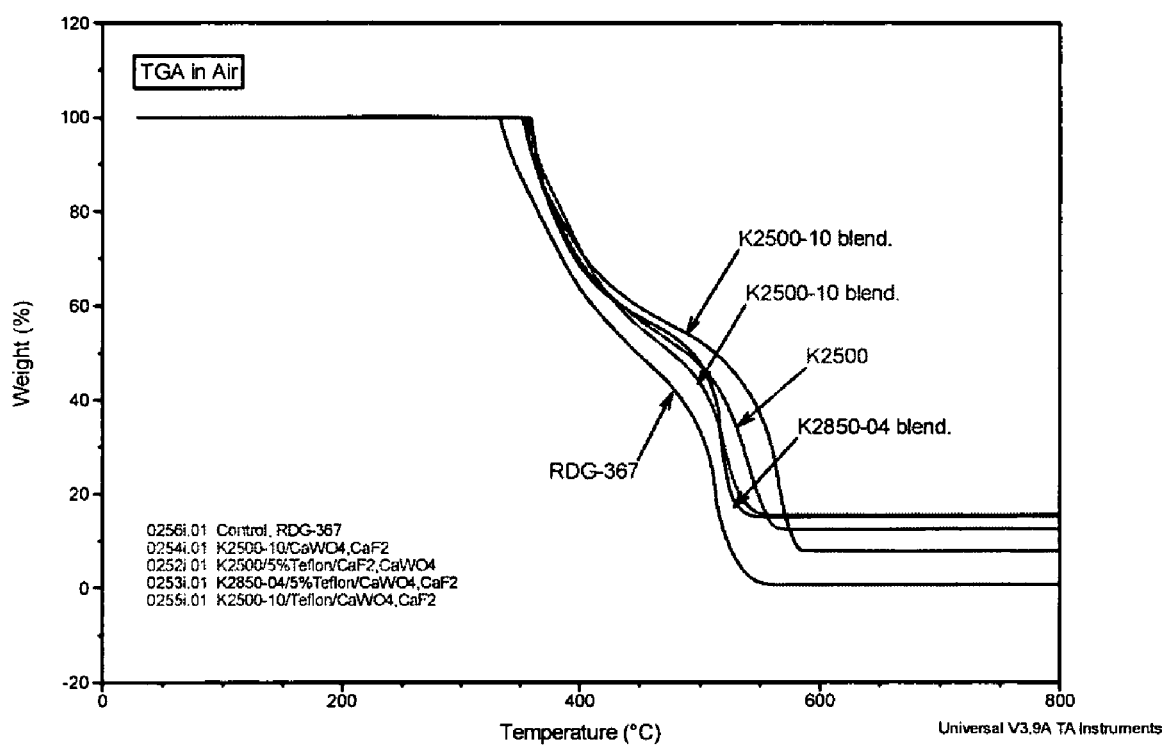
FIG. 1 plots a series of compounds having various levels of fillers, including TEFLON, calcium fluoride and calcium tungstate.

The invention relates to a limited combustion fluoropolymer that results from a blend of the fluoropolymer with one or more inorganic fluoride compounds.

Fluoropolymers of the invention include any fluoropolymer that is melt processable. These may be homopolymers, such as polyvilidene fluoride, or copolymers, such as, but not limited to, vinylidene fluoride/hexafluoropropylene copolymer, vinylidene fluoride/chlorotrifluoroethylene copolymer, vinylidene fluoride/tetrafluoroethylene copolymer ethylene/tetrafluoroethylene copolymer, fluorinated ethylene propylene (FEP) and mixtures thereof. Fluoropolymers of the invention also include partially fluorinated polymers, such as ETFE and ECTFE, which may have similar decomposition products as fully fluorinated polymers.

Preferably the fluoropolymer is a polyvinylidene fluoride polymer. "PVDF" or PVDF resin or PVDF polymer refers not only to homopolymers of PVDF but also to copolymers prepared from at least about 75% by weight of vinylidene fluoride (VDF) monomer. Comonomers may include other fluorinated monomers such as: hexafluoropropylene (HFP), chlorotrifluoroethylene (CTFE), tetrafluoroethylene (TFE), and vinyl fluoride. Preferred are the homopolymers and the copolymers prepared from VDF and HFP to which small amounts (up to about 5 weight percent, preferably about 0.01 to about 0.05 weight percent) of PTFE may be added. Since pure PVDF has a PHV of about 6200 BTU per pound, about 50 weight percent is the maximum amount used in a LC Cable in order to meet the PHV limit of about 3500 BTU/pound. The amount of PVDF used can be increased slightly if additives are added to lower the caloric content of the resin. The PVDF is present at from 20 to 99 percent by weight, and more preferably from 40 to 99 percent by weight.

Inorganic fluoride compounds useful in the fluoropolymer composition do not react with HF. HF is the decomposition product of PVDF that reacts with most fillers and other components of a cable, resulting in large amounts of smoke. The inorganic fluoride, or mixtures thereof, is present in the composition at from 1 to 80 percent, and preferably from 1 to 60 percent, and most preferably from 15 to 50 percent by weight.

Examples of inorganic fluoride compounds useful in the invention include, but are not limited to calcium fluoride, lithium fluoride, barium fluoride, sodium fluoride, aluminum magnesium fluoride, and other inorganic fluorides, whether occurring naturally or synthetically manufactured and mixtures thereof. A preferred fluoride compound is calcium fluoride. Calcium fluoride having a particle size of 10 microns or less is useful for applications in wire and cable. Calcium Fluoride having particle size below 325 mesh may also be suitable for these applications. Calcium Fluoride having particle size above 325 mesh may be suitable for applications unaffected by larger particles such as thick walled pipe or injection molded articles.

Inorganic fluoride does not affect smoke generation properties of the PVDF, and therefore can be used in plenum and limited combustible products without adverse reactions. In the case of limited combustible cables, the level of inorganic fluoride can be adjusted to produce a compound with a targeted potential heat value below that of the unfilled PVDF polymer. In addition, the presence of inorganic fluoride tends to improve the tenacity of the char that forms on combustion, providing additional improvements in burning characteristics over existing plenum products.

It has also been found that the addition of calcium fluoride does not adversely affect the processability of the product. Calcium fluoride appears to provide a stable glassy char, and may prove to impart additional advantages in products requiring long term fire protection such as a circuit integrity cable.

In addition to the inorganic fluoride, other additives may also be added to the fluoropolymer. Useful additives include, but are not limited to calcium carbonate, calcium molybdate, calcium tungstate, aluminum silicate, pigments and mixtures thereof. The addition of PTFE powder in the compounds has shown to have some potential benefits in mechanical properties. It is not believed that such addition would have any negative effects on the performance of the product.

In U.S. patent application Ser. No. 10/755,504 it was found that low levels of tungstate, molybdate or silicate additives can reduce the thermal stability of a fluoropolymer and therefore allow a good char to form sooner and protect the fluoropolymer. The inorganic fluoride may allow for the use of higher levels of tungstate and other additives, enabling higher LOI compositions. Such high LOI compositions could be useful in circuit integrity cable and other uses with similar requirements.

In one preferred embodiment, in limited combustible applications calcium tungstate or calcium molybdate are added to tailor the burning properties of the compound. These additives are typically used at from 0 to 10 weight percent, and preferably at less than 5 percent by weight.

Inorganic fluorides can be added to the fluoropolymer by means known in the art such as in the latex, as a powder blend, or via melt processing such as a twin screw compounder.

Cables and other articles may be produced from the composition of the invention by means known in the art such as, but not limited to, injection molding, and extrusion. Processing characteristics of filled compounds appear similar to that of their unfilled compounds. Subtle differences in tooling design such as lower draw down ratios, slower speeds, higher temperatures may or may not be needed. Cables produced from the composition have extremely low smoke generation, no flame spread, and has extremely low potential heat contribution compared to existing plenum rated cables.

Limited combustible article formed form the composition made include, but are not limited to, fiber optic cable, copper cable, shield tapes, coaxial cable, raceway conduit, and circuit integrity cable.

The composition of the invention may also be used to produce other articles, including piping systems, fittings, and building components.

In addition to improving flame, BTU and smoke properties of cables and other articles, the addition of inorganic fluoride to a PVDF provides a means of improving properties and reducing costs of PVDF articles. Filled PVDF has multiple applications, that may include increasing flexural modulus, increasing hardness, reducing the coefficient of thermal expansion, improving chemical resistance, improving permeation resistance, reducing smoke generation in complex plenum cable construction, reducing the dielectric constant, and also introducing low/moderate cost polymer extender. The inorganic fluoride can be added to reduce shrinkage of the product to tailor to desired customer specifications.

EXAMPLES

Example 1

The thermal stability of calcium fluoride with PVDF was evaluated via pan bakes followed by compounding. PVDF and calcium fluoride were powder blended, and the powder blend exposed to temperatures of 550° F. for durations of up to 1 hour. A failure, which would indicate a reaction between PVDF and the filler is the formation of black char specks. Many fillers such as silicates will show a reaction when exposed to such conditions (i.e. black specs) No reaction was noted in the pan bakes indicating that the compound could probably be melt processed without the hazards of a reaction between components. Compounds were prepared containing various levels of PTFE and calcium fluoride using a twin screw compounder. These compounds were then processed in an injection molder. During the compounding and processing phase, no evidence of reactivity between the calcium fluoride and PVDF was noted.

Example 2

PVDF compounds containing calcium fluoride were tested using Thermogravametric analysis (TGA) to examine the effects on the thermal stability. In FIG. 1. a series of compounds having various levels of Teflon, calcium fluoride and calcium tungstate were tested via TGA in air. The results clearly indicate that the onset temperature for HF generation is unchanged when calcium fluoride is added, even at levels as high as 20%. As a comparison, RDG-367 is shown, which is a Kynar blend containing 0.5% calcium tungstate as the only filler. It was noted that the presence of calcium fluoride may help to stabilize the compound. In one case, the addition of calcium tungstate did not drop the decomposition onset temperature. It is believed that the presence of the calcium fluoride may have a normalizing effect on the product, possibly due to the glassy char formed by its addition (further work remains to better understand the data).

Example 3

Two compounds were prepared for fiber optic cable production (RDG-373 and RDG-374). The compounds were designed to have a targeted heat of combustion to allow the entire cable to have a potential heat value of 3500 BTU/lb. The calcium fluoride content in each of these compounds was approximately 20 percent. The compounds were used to produce fiber optic cables having a loose tube design. Other cable components included glass strength members (coated with PVDF ultra flex) and the fiber optic components. Cables were produced and tested at UL on Jun. 3, 2004 per NFPA-255 Steiner Tunnel Test. The cables passed the test with a zero flame spread and a smoke developed index of 20. The pass/fail criteria for this test to meet limited combustible requirements are a flame spread maximum of 20 and a smoke developed index maximum of 50. The cable was tested for potential heat values by NFPA-259 and a potential heat of 3663 btu/lb was determined. This is above the 3500 btu/lb, which is the upper limit for this requirement. One of the reasons for this higher value is that the cable produced was missing one end of glass yarn that had been designed into the cable. It is estimated that the loss of this single glass yarn end resulted in a cable having a caloric value 90-100 Btu higher then for the targeted cable. In reality, the total caloric value for the designed cable is estimated to be approximately 3570 (only 70 btu/lb higher then predicted). Reduction of the potential heat below 3500 btu/lb can be easily achieved by the addition of an additional glass yarn end, the addition of a small percentage of calcium fluoride, or by increasing the comonomer content in the tube. All three approaches can be implemented without negative consequence of the burn properties of the product.

What is claimed is:

1. A melt processable composition comprising a melt processable blend of:
    a) from 20 to 99 percent by weight of one or more fluoropolymers; and
    b) from 1 to 80 percent by weight of one or more inorganic fluorides,
    wherein said composition is a melt processable, and wherein said composition has a smoke developed index (SDI) below 50, and a flame developed index (FDI) below 25 when tested by NFPA-255.

2. The composition of claim 1 wherein said fluoropolymer is selected from the group consisting of polyvinylidene fluoride homopolymer, vinylidene fluoride/hexafluoropropylene copolymer, fluoride/chlorotrifluoroethylene copolymer, vinylidene fluoride/tetrafluoroethylene copolymer, ethylene/tetrafluoroethylene copolymer, fluorinated ethylene propylene, and mixtures thereof.

3. The composition of claim 1 wherein said fluoropolymer comprises 40 to 99 percent by weight and said inorganic fluoride comprises from 1 to 60 percent by weight.

4. The composition of claim 1 wherein said inorganic fluoride is selected from the group consisting of calcium fluoride, lithium fluoride, barium fluoride, sodium fluoride, aluminum magnesium fluoride, and mixtures thereof.

5. The composition of claim 1 wherein said inorganic fluoride comprises calcium fluoride.

6. The composition of claim 1 further comprising from 0.1 to 10 percent by weight of additional additives.

7. The composition of claim 6 comprising less than 5 percent by weight of additional additives.

8. The composition of claim 6, wherein said additives are selected from the group consisting of calcium carbonate, calcium molybdate, calcium tungstate, zinc oxide, polytetrafluoroethylene powder and mixtures thereof.

9. The composition of claim 1, further comprising a fiber optic cable, copper cable, shield tapes, coaxial cable, raceway conduit, circuit integrity cable, piping systems, fittings, films, sheets or building components.

* * * * *